July 31, 1928.

W. L. BURNER ET AL

DUMP CAR

Filed Aug. 21, 1925

1,678,765

8 Sheets-Sheet 1

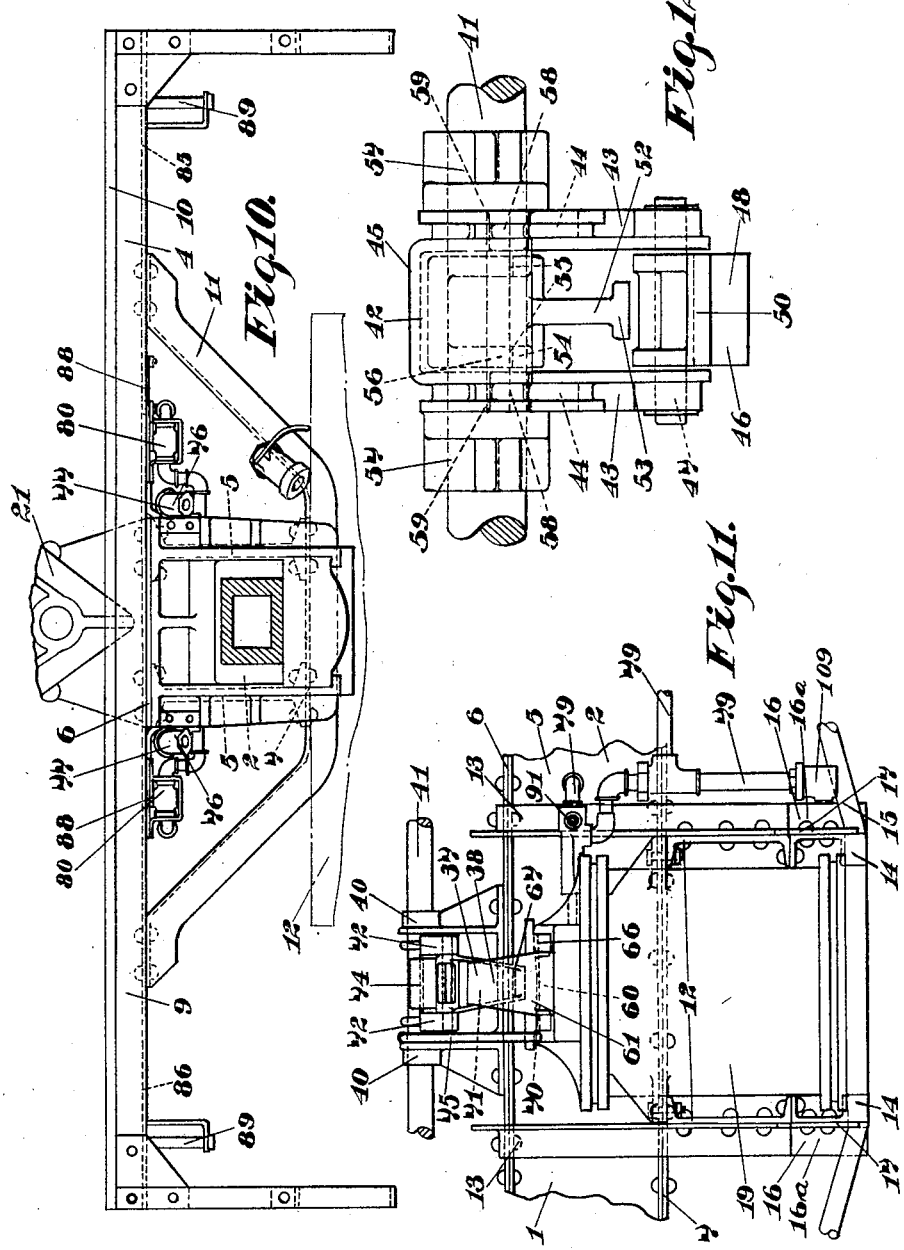

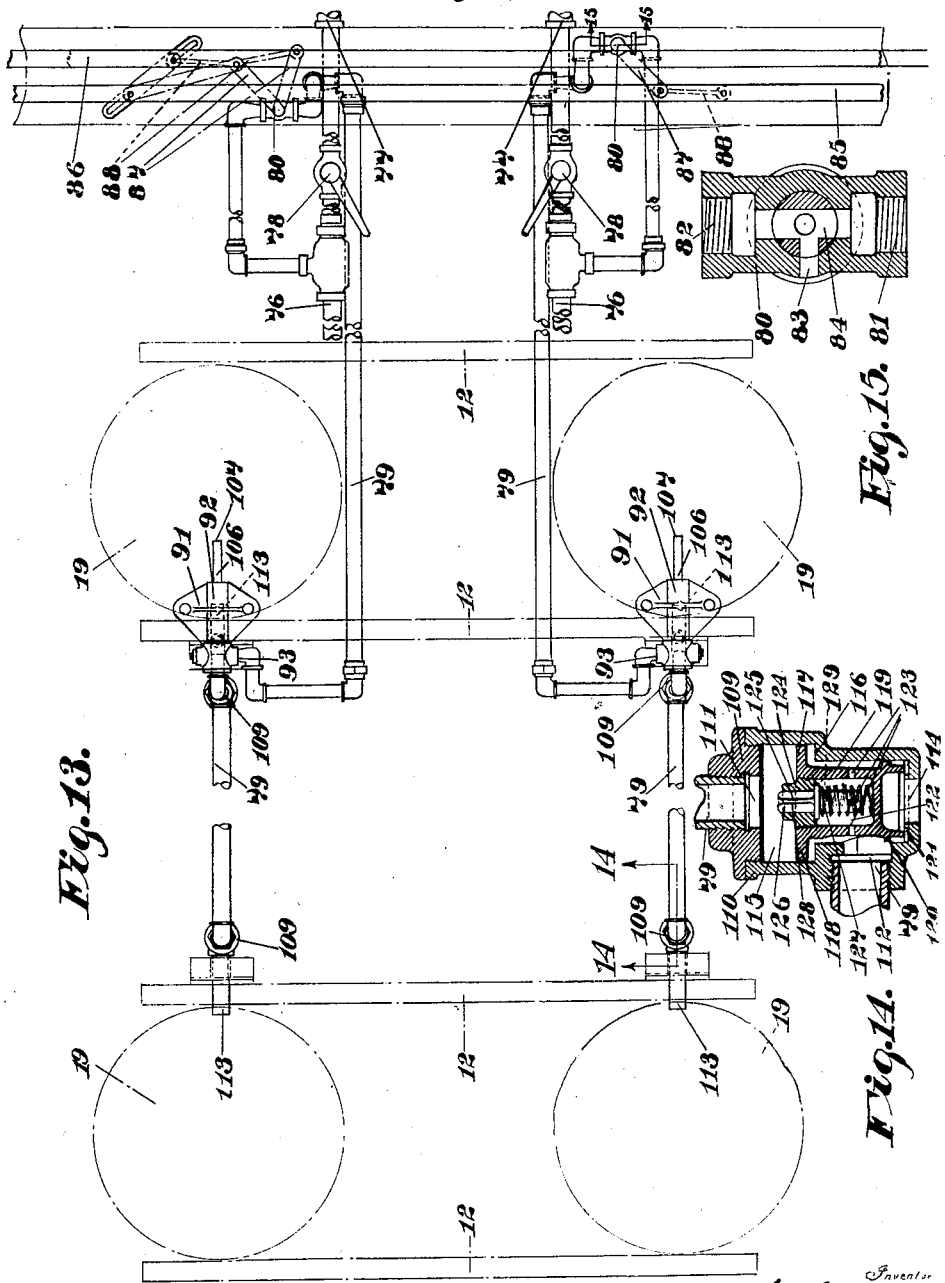

Patented July 31, 1928.

1,678,765

UNITED STATES PATENT OFFICE.

WILLIAM L. BURNER, OF KOPPEL, PENNSYLVANIA, AND OSCAR E. KANTENWEIN, OF OAK PARK, ILLINOIS, ASSIGNORS TO KOPPEL INDUSTRIAL CAR AND EQUIPMENT COMPANY, OF PITTSBURGH, PENNSYLVANIA, A CORPORATION OF PENNSYLVANIA.

DUMP CAR.

Application filed August 21, 1925. Serial No. 51,582.

This invention relates to railway dump cars, and particularly to that type in which the body is tiltably mounted to discharge the lading to one side or the other of the railroad track rails, and has for an object the provision of simple and efficient means for operating such a body.

Another object of the invention is to provide fluid pressure means whereby the tilting body of a dump car may be automatically unlocked, tilted, and locked when it has been returned to its normal righted position.

Another object of the invention is to provide fluid pressure operated means for operating the tilting body of a dump car, said means embodying devices for automatically controlling the fluid pressure.

Another object of the invention is to provide a tiltable body dump car with means for operating such body, which body and means are so arranged that the cylinders which are a part of the operating means may be positioned further from the longitudinal center line of the car than has heretofore been possible, thus rendering it possible to tilt the body a maximum distance with a minimum of power.

A further object of the invention is to provide a tiltable body dump car with a fluid pressure body operating cylinder adapted to receive a portion of a car body when said body is tilted in a direction toward such cylinder which permits the cylinder to be placed a greater distance from the longitudinal center line of the car than has heretofore been possible, and at the same time provides for a maximum tilting movement of the car.

These and other objects will be apparent from the following description and appended claims.

Figure 1:
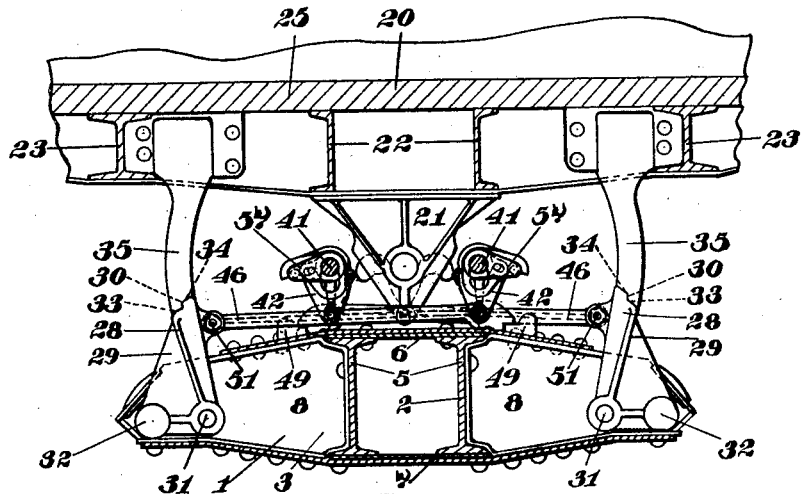
Figure 2:
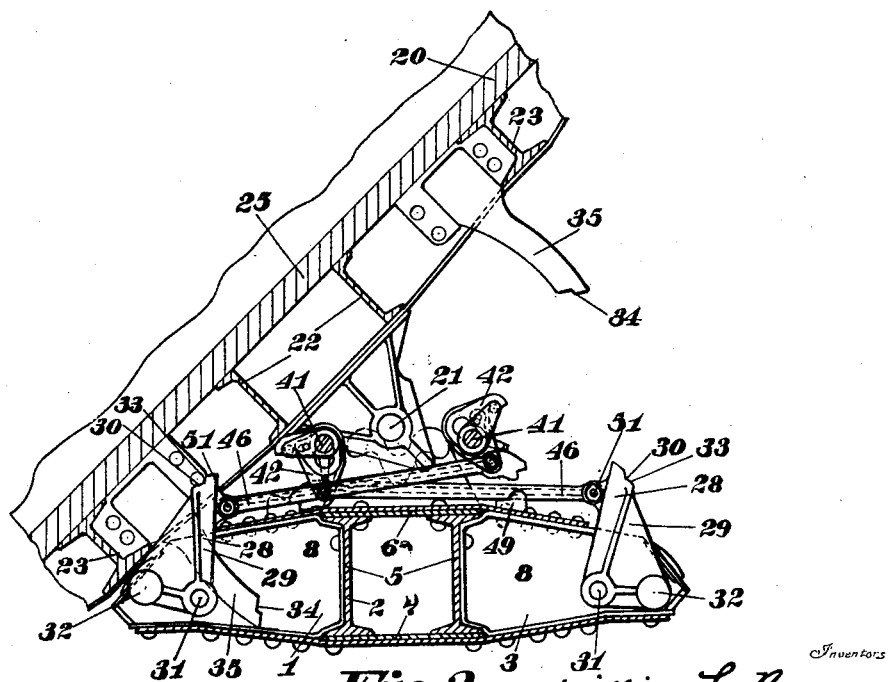
Figure 3:
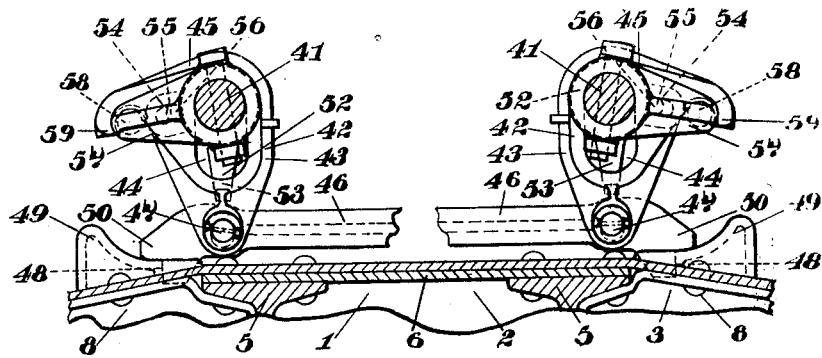
Figure 4:
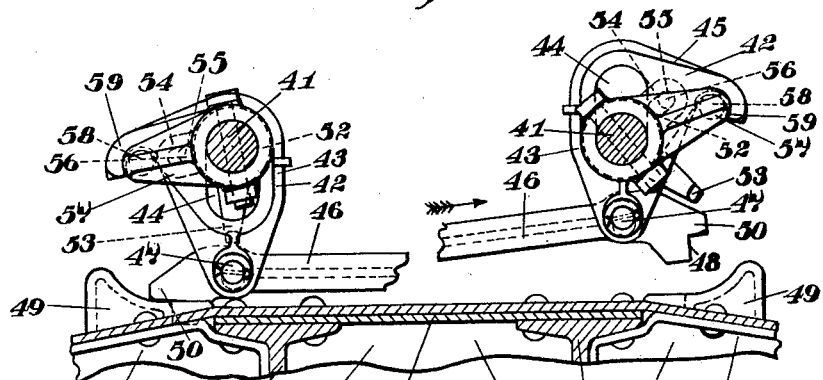
Figure 5:
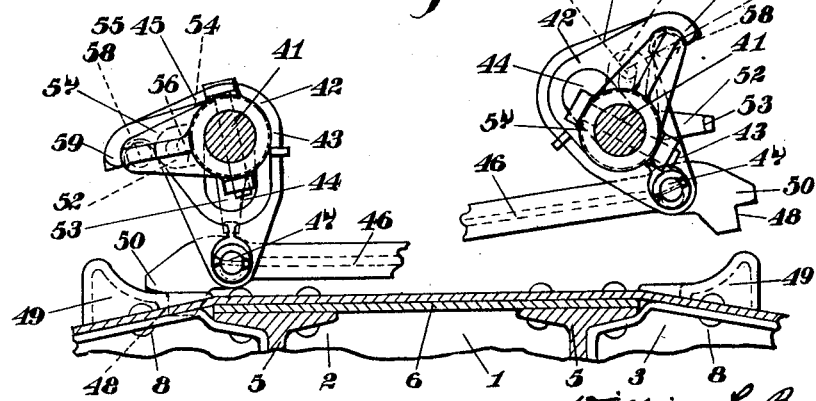
Figure 6:
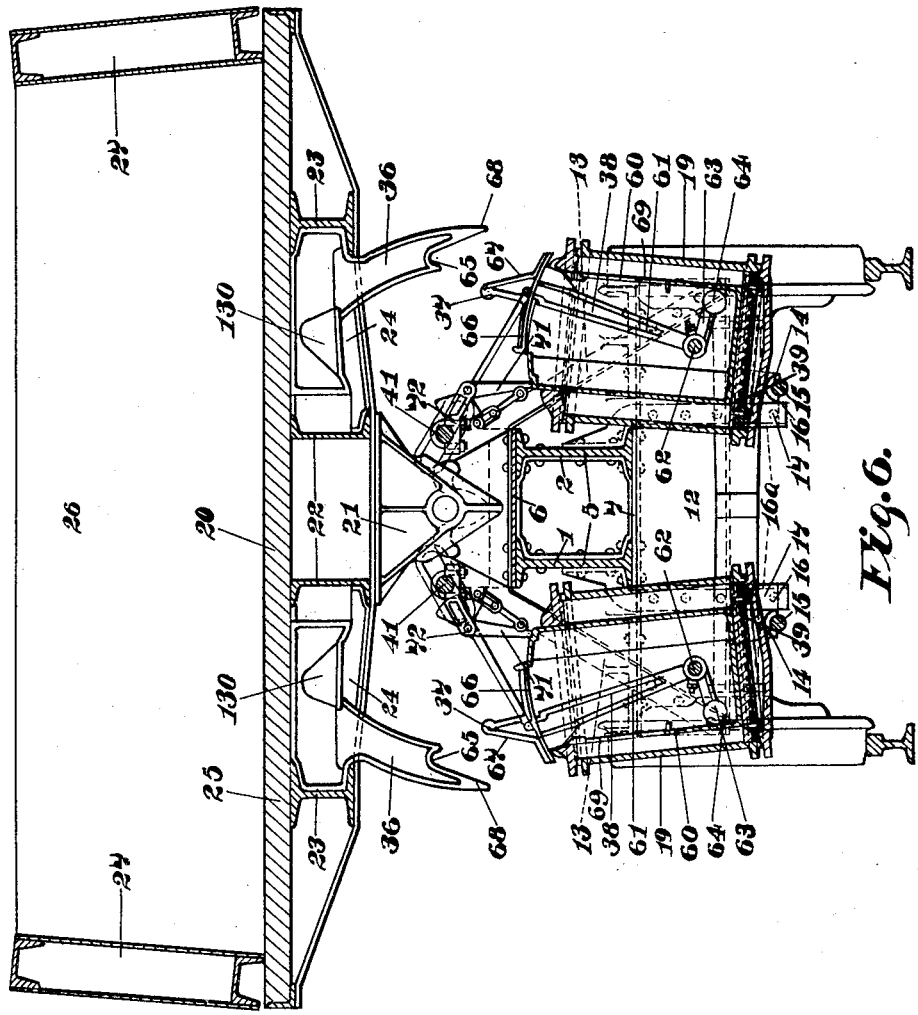
Figure 7:
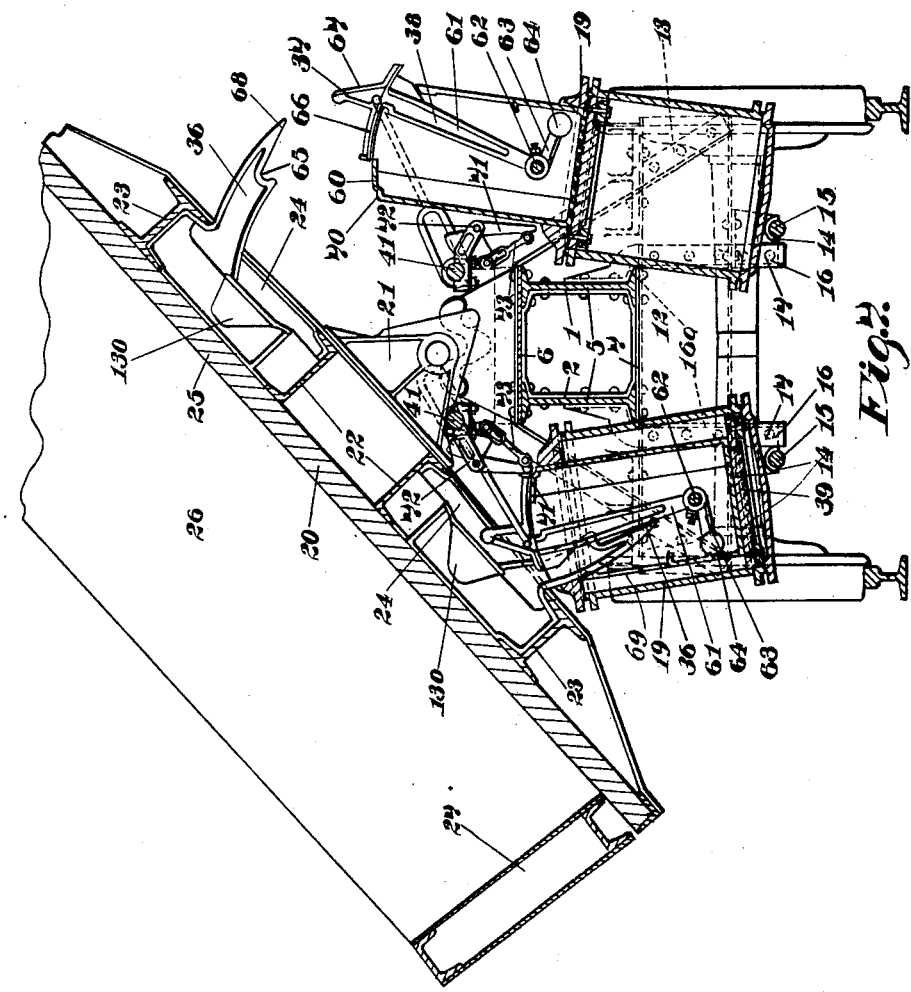
Figure 8:
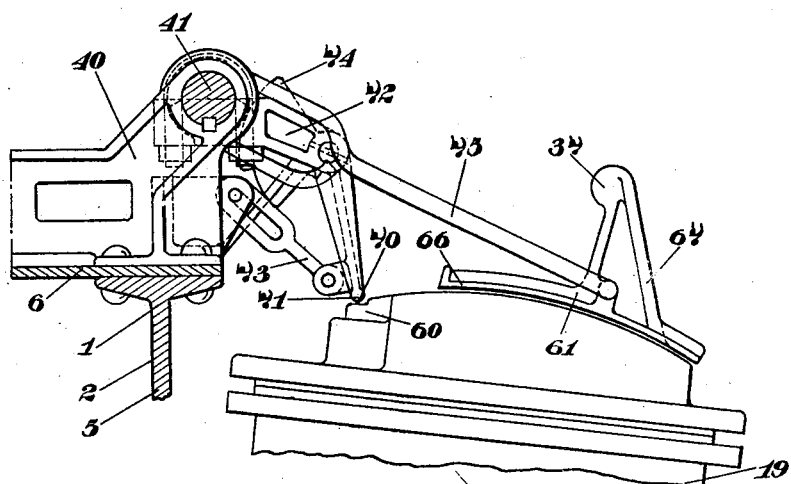
Figure 9:
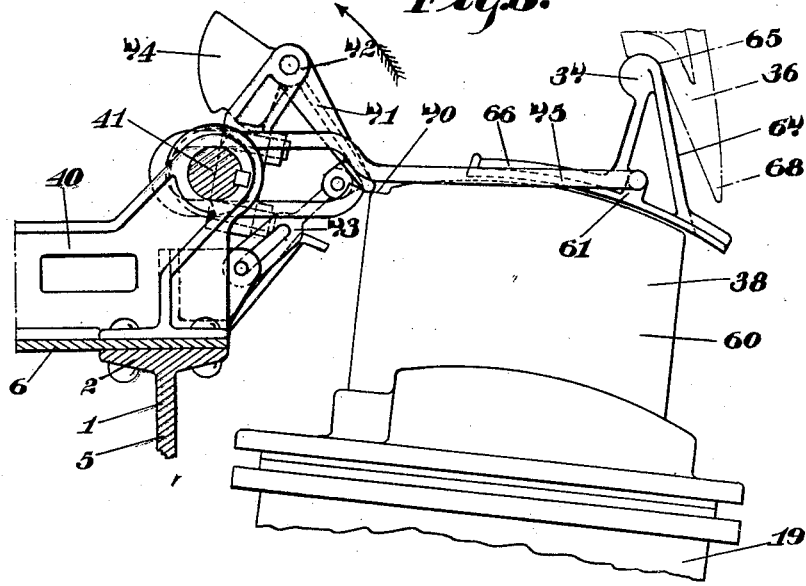
Figure 16:
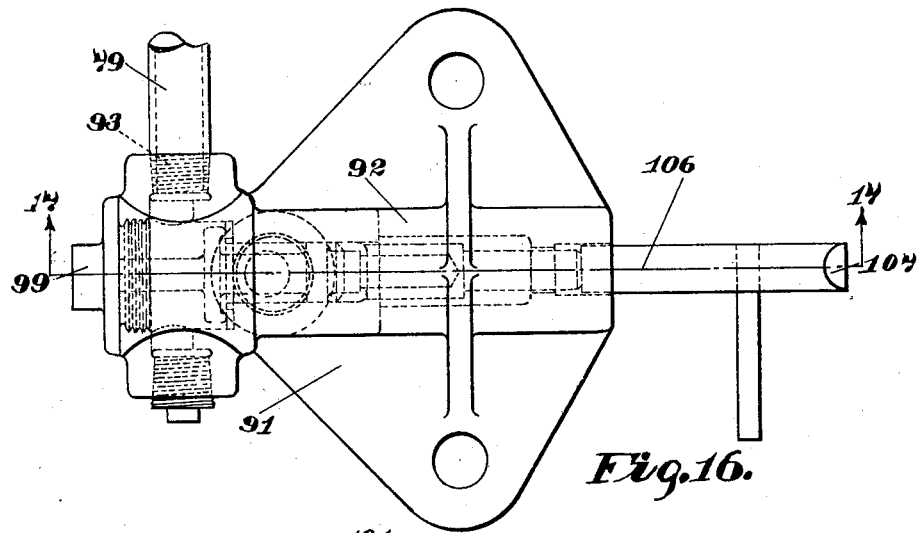
Figure 17:
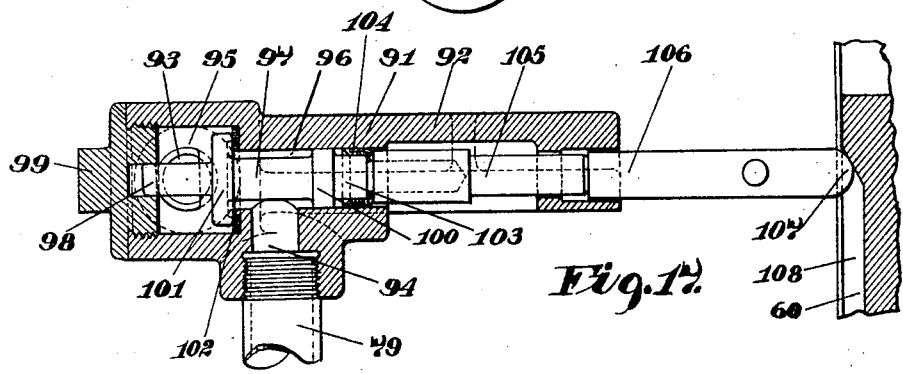
Figure 18:
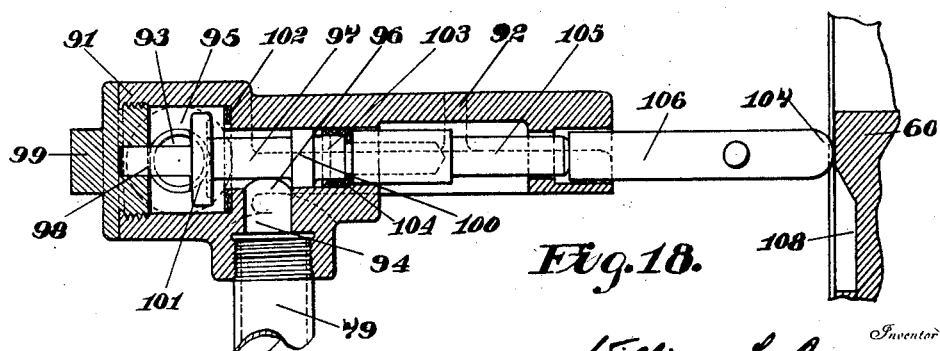

Referring to the drawings in which like reference characters refer to like parts, Fig. 1 is a cross sectional view through a portion of a car constructed in accordance with the invention, the car body being in its normal righted and locked position; Fig. 2 is a like view showing the car body tilted to one side, the locking mechanism being shown in unlocked position at the side toward which the body is tilted and the opposite side in its locked position; Figs. 3, 4, and 5 are enlarged detail sectional views of the locking mechanism, the parts thereof at one side of the car being shown in their several stages of operation; Fig. 6 is a cross sectional view through the car showing the car body in its normal righted position and the operating mechanisms in their normal positions of rest; Fig. 7 is a like view showing the car body tilted to one side and the mechanism at the opposite side being shown in its extreme body tilting position; Fig. 8 is an enlarged detail view showing a portion of one of the fluid pressure cylinders and mechanism operated thereby, the piston rod and mechanism being shown in their normal positions of rest; Fig. 9 is a like view showing the piston rod engaging the car body to tilt it to one side, and also shows the mechanism engaging therewith in one of its stages of operation; Fig. 10 is an enlarged end elevational view of a portion of the car; Fig. 11 is an enlarged side elevational view of a portion of the underframe and the body operating mechanism; Fig. 12 is an enlarged side elevational view of a portion of the locking mechanism; Fig. 13 is a plan view of the fluid pressure mechanism; Fig. 14 is a sectional view through one of the pressure release valves taken on the line 14—14 of Fig. 13; Fig. 15 is a sectional view taken on the line 15—15 of Fig. 13; Fig. 16 is an enlarged detail plan view of the pressure cut-off valve; Fig. 17 is a sectional view of the same taken on the line 17—17 of Fig. 16, the valve being shown closed; Fig. 18 is a like section showing the valve open.

Referring now in detail to the drawings, the reference character 1 indicates the underframe of the car which may be of any suitable form or construction but as shown in the drawings preferably comprises a center sill 2, bolsters 3 and end sills 4. The center sill comprises spaced longitudinal members 5 to which are secured top and bottom cover plates 6 and 7 respectively. Each of the bolsters 3 comprises a plurality of members 8, each of which members is arranged at one side of the center sill and at its inner end is secured to the center sill. These members are further connected together through the medium of top and bottom plates which are secured to the members 8 and to the center sill by rivets or other suitable means. Each of the end sills 4 rests on and is secured to the center sill and comprises a channel shaped member 9 having its web disposed horizontally and its flanges presented upwardly, there being a filler 10 between the flanges. Each of these end sills is supported and further connected with the center sill, through the medium of a U-shaped member 11, the central portion of which is secured to the underside of the center sills and the upwardly extending ends of which are secured to the member 9 between the center sill and the outer ends of the end sill.

Between the transverse center line of the underframe and each of the bolsters, transverse members 12 are provided which are preferably of channel form having their webs disposed vertically and their flanges disposed horizontally toward each other. These members pass beneath the center sill and are secured to the underside thereof and they further extend some distance on each side of the center sill. To assist in supporting the ends of these members angular members 13 are provided, the ends of each of which are secured to the end portions of the member 12 while the central portion is arched over the center sill and is secured to the upper portion of such sill. To the lower flange of each of the members 12 and at each side of the center sill a truss rod saddle 14 is secured for the accommodation of the truss rod 15, the ends of such rod being anchored in the bolsters 3. To further support and stiffen each of the members 12 a vertically disposed angular member 16 is provided having flanges 16ª and 17. The upper portion of the flange 16ª is secured to the side of the center sill while the lower portion of such flange is connected with the web of the member 12. The lower portion of the flange 17 is secured to the web of the member 12 and to the truss rod saddle 14. At each side of the center sill and between each pair of the members 12 a fluid pressure cylinder 19 is provided, having flanges which rest on and are secured to the upper flanges of the members 12.

The body 20 of the car is tiltably supported upon the underframe by means of hinges 21 which have been fully and clearly described in our pending application for United States Patent filed September 11, 1924 for dump car, and serially numbered 737,028.

The body 20 comprises longitudinally disposed sills 22 and 23 and transverse members 24 to all of which the floor 25 may be secured. This body also comprises stationary end walls 26 and movable side walls or doors 27, which side walls are operated by means which will be fully described in an application for United States patent which is now being prepared and which will be filed in our names. The side walls or doors are made the subject of a pending application for U. S. patent filed in our names on March 28, 1925, Serial No. 19,021.

Adjacent each of the outer ends of each bolster 3 a member 28 is provided which comprises sides 29 and top 30 which connects the sides. This member 28 straddles the bolster and the sides 29 thereof adjacent their lower ends are pivotally connected with the bolster through the medium of a pin or bolt 31 which passes through the sides 29 and bolster 3. Opposite the pin 31 and located outwardly therefrom each of the sides 29 is provided with a weight 32 which is preferably integral with the side or may be made separate and be secured thereto. These weights are for the purpose of moving the support to its normal supporting position as will hereinafter be more fully described. The upper surface of the top 30 is sloped downwardly and outwardly and is offset at 33. This top 30 is adapted to be engaged by the lower surface 34 of a support 35 which is secured to the body, such surface conforming to the shape of the upper surface of the top 30 of the support 28.

Above each of the cylinders 19, the body 20 is provided with a downwardly depending member 36 which is adapted to be engaged by the end portion 37 of a piston rod 38 mounted on a piston 39 movably mounted in the cylinder 19. It will be noted that when the body 20 is in its horizontal or righted position the supports 28 and 35 will be in engagement with each other and that the portion 37 of each piston rod will not be in engagement with the corresponding member 36. When it is desired to tip the car this portion of one piston rod will be moved upwardly by fluid pressure, into engagement with the corresponding member 36 as will hereinafter be more fully described.

At intervals throughout the length of the underframe, bearing members 40 are provided in each of which on each side of the longitudinal center line of the underframe a shaft 41 is journalled which shaft is for the purpose of operating the locking mechanisms for the supports 28. Each shaft operates the locking mechanisms at one side of the car and each locking mechanism comprises a lifting link 42 having spaced sides 43 which are provided with slots 44 through which the shaft 41 passes. These sides are connected together at their top by a web 45. The lower end portions of the sides 43 overlap the sides of a locking bar 46 and are pivotally connected therewith through the medium of a pin 47. This locking bar extends outwardly beyond the pin and at its end, adjacent the lifting link 42, is provided with a stop 48 which is adapted to engage with a stop member 49 formed integral with or secured to the bolster or other rigid part of the underframe. This bar is also provided with an extension 50 which is adapted to overlie and engage the upper surface of the member 48 to assist in supporting the locking bar in its proper locking position. This locking bar also extends in the opposite direction to the support 28 located on the other side of the longitudinal center line of the car, and at its end is pivotally connected with such support through the medium of a pin 51. Between the sides 43 of the lifting link 42 a locking member 52 is loosely mounted on the shaft 41 and movable relative thereto, such member having a downwardly depending leg 53 the lower end of which is adapted to engage the upper surface of the locking bar to prevent such bar from being accidentally moved out of engagement with the stop member 49. This member 52 is also provided with a leg 54 which extends outwardly from the shaft 41 and at an angle to the leg 53. This leg 54 is provided with a slot 55 through which a pin 56 passes, the ends of such pin being mounted in a side 43 of the lifting link 42. Adjacent each of the sides 43 of the link 42, the shaft 41 is provided with levers 57 which adjacent their ends are provided with lugs 58 adapted to engage a notch 59 formed in the adjacent side 43 of the link 42. The levers 57 are both secured to the shaft 41 and are rotatable therewith.

Each of the piston rods 38 comprises a hollow sleeve part 60, the lower end of which is mounted on the piston 39 and also comprises a part 61 which extends into the hollow portion of the part 60 and at its lower end is pivotally connected therewith by a pin 62 or any other suitable means. This part 61 adjacent its lower end is provided with an outwardly extending arm 63, which at its outer end is provided with a weight 64 that will, due to gravity, insure the movement of the part 61 to its proper normal position of rest. The upper end 37 of this part projects some distance out of the part 60 and is so shaped as to operatively engage the member 36 within a curved notch 65 formed in the lower portion thereof. Below its upper end 37 this part is provided with an enlarged portion 66 which is adapted to cover the opening in the part 60 and thus prevent dirt and other foreign matter from accidentally entering the part 60 and cylinder 19 when the part 61 is in its normal position of rest and as it is operated.

Extending downwardly and outwardly from the upper end 37, this part 61 is provided with a surface 67 which preferably terminates at substantially the top of the cylinder 19. This surface is adapted to be engaged by the end 68 of the member 36, which end is some distance in advance of the notch 65. Below the portion 66 the part 60 is provided with a slotted opening 69 through which a portion of one of the members 36 is adapted to pass when the car body is dumped to one side.

The top portion of each of the parts 60 is provided with an offset 70 which forms a seat for the lower end of a lever 71 which is pivotally connected with spaced arms 72 secured to the shaft 41. To the lower end portion of the lever 71 one end of a link 73 is pivotally connected, the opposite end of such link being slidably connected with the bearing member 40 or any other stationary part. Between the arms 72 and at one side of the pivotal connection between such arms and the lever 71, this lever is provided with a weight 74 which, due to gravity, has a tendency to force the lower portion of the lever toward the part 60, the link 73 being adapted to limit the movement of the lever in this direction, thus insuring its proper engagement with the offset 70 of the part 60. The lever 71 and arms 72 are for the purpose of rotating the shaft 41 to operate the body supporting and body locking members and their locking means as will hereinafter be fully described.

To each of the parts 61 there is pivotally connected one end of a member 75, the opposite end of such member being loosely connected with one of the shafts 41. This member is for the purpose of holding the part 61 in such position, when it is in its raised position and out of engagement with the notch 65, that the end portion 37 thereof will be in the path of travel of the notch 65, so that should the part 61 for any reason accidentally remain in its raised position after the car has been dumped to one side, or should the operator again admit pressure into the cylinder after the car has been dumped and force the parts 61 to their raised positions, the car body, as it is righted, will not damage the parts 61.

In the present embodiment of the invention there are a pair of cylinders 19 on each side of the center sills of the underframe, the cylinders of each pair being operatively connected together and controlled so that they operate in unison. In the underframe there are mounted fluid pressure supply pipes 76 which extend throughout the length of the car and at their ends are provided with angle fittings 77 which in turn are provided with connections or hose adapted to be connected with similar hose on adjacent cars when a plurality of the same type of cars are coupled together or with the pressure supply source. Adjacent each end of the car each of the pipes 76 is provided with a stop cock 78. When a single car is to be operated the cocks at one end of the car are open while those at the opposite end are closed. When a plurality of coupled cars are to be operated all of the cocks in the cars are open except the two cocks at the farthest end of the last car. Between the cocks in each supply pipe a branch pipe 79 is provided which connects the supply pipe 76 and cylinders 19. Adjacent one end of the car the pipes 79 are provided with three way valves 80, each having ports 81, 82 and 83 which open toward the pipe 76, cylinders 19 and to the atmosphere respectively. These valves each have a rotatable plug 84 adapted to be moved to such a position that the fluid pressure may be conducted from the supply pipe 76 to the cylinders 19 or moved to such a position that the fluid pressure in the cylinders may be conducted to the atmosphere through the port 83. To operate the valves 80, rods 85 and 86 are provided which extend from side to side of the underframe, and are each operatively connected with one of the valves 80 through the medium of a lever 87 connected with the plug 84 of the valve, and a link 88 which is connected with the lever 87 and one of the rods. At their ends these members 85 and 86 are provided with operating handles 89, and intermediate their ends are slidably mounted in brackets which may be secured to the underframe.

Between each valve 80 and the corresponding cylinders 19 the pipe 79 is provided with an automatic cut off valve 91, which is adapted to automatically cut off the fluid pressure from the cylinders 19, after the pistons and piston rods thereof have been moved upwardly a predetermined distance.

This cut off valve 91 comprises a casing 92 having an inlet port 93 which is connected with the portion of the pipe 79 from the supply pipe and also has an outlet port 94 which is connected with that portion of the pipe 79 which extends to the cylinders 19. Within the casing 92 a chamber 95 is formed into which the port 93 opens and also has formed therein a chamber 96 which opens into the chamber 95 and into which the outlet port 94 opens. Within the chambers 95 and 96 a valve stem 97 is provided which has an end portion 98 slidably mounted in a recess formed in a plug 99 which plug forms one of the walls of the chamber 95. This member extends into the chamber 96 and beyond the outlet port 94 is provided with an enlarged portion 100 which fits the chamber 96 and is slidable therein. Between the end portion 98 and the portion 100, the valve stem is provided with an enlarged portion or valve 101 which is adapted to seat on a valve seat 102 formed in the chamber 95 to shut off the fluid pressure from the chamber 96. Between the valve 101 and the portion 100 the stem is of considerably smaller diameter than the valve 101 or the portion 100, thus providing suitable space between the stem and the inner surface of the chamber 96 for the passage of fluid pressure. The end 103 of the stem is of smaller diameter than the chamber 96 and seats in a packing cup 104 which is mounted on the inner end of a valve stem extension 105 and prevents the escape of fluid pressure through the chamber 96 to the atmosphere, the outer end portion being suitably mounted in the casing 92. The end of this extension engages the inner end of a cut off rod 106 within the casing, the outer end 107 of this rod being rounded and adapted to engage the push rod sleeve 60. It will be noted that the stem is movable forward a sufficient distance to close off the fluid pressure supply from the chamber 96, and is movable backward a sufficient distance to permit the fluid pressure to enter the chamber 96.

The piston rod sleeve 60, adjacent its lower end has formed therein a groove 108 in which the end 107 of the cut off rod is adapted to move when the piston rod has been moved upwardly a sufficient predetermined distance to bring the recess opposite the end 107, thus permitting the valve 101 to move to its closed position. When the piston rod moves downwardly the cut off rod will be engaged by the sleeve 60 and forced inwardly so that the valve 101 will be moved to its full open position, and by such engagement will be held in such position until the piston rod is moved upwardly again a sufficient distance for the groove 108 to be opposite the end 107 of the cut off rod 106.

Between the cut off valve and the cylinders 19 exhaust valves 109 are provided each of which is located adjacent one of the cylinders 19. Each of these valves has a casing 110 in which is formed an inlet port 111 which is connected with the portions of the pipe 79 from the port 94 of the cut off valve, an outlet port 112 which is connected with the portions of the pipe 79 which opens into the inlet port 113 of the cylinder 19 and has an outlet port 114 which opens to the atmosphere. Within the casing a chamber 115 is formed and with which the ports 111, 112 and 114 communicate. This chamber is of greater diameter at its upper end than at its lower portion; thus an annular shoulder 116 is formed within the chamber. Movably mounted in the chamber is a piston valve member 117 which comprises an upper portion 118 which fits the upper portion of the chamber and is slidable therein. Integral with this portion and extending downwardly therefrom into the lower portion of the chamber is a portion 119 which is for the greater portion of its length of smaller diameter than the lower portion of the chamber. As indicated by the reference character 120 the portion 119 is increased in diameter to fit the lower portion of the chamber and is slidable therein. The lower end of the portion 119 is adapted to seat on a valve seat 121 which surrounds the outlet port 114 and prevents accidental escape of fluid pressure to the atmosphere. The member 117 has a recess 122 formed in its central portion, which communicates with the lower portion of the chamber 115 through the medium of openings 123 which are formed in the portion 119.

The upper end of this recess is restricted in size by a plug 124 having an opening 125 formed therein which communicates with the upper portion of the chamber 115 and with the recess 122. Within the member 117, a valve stem 126 is provided which has a round lower portion 127, an upper portion 128 cruciform in cross section and a round intermediate portion 129 which portion is of greater diameter than the portions 127 and 128. The portion 127 extends below the plug 124 and is surrounded by a spring 129, the lower end of which is seated on the member 117 and the upper end of which is seated on the lower surface of the portion 129. The upper surface of the portion 129 is adapted to engage the lower surface of the plug 124 to prevent the escape of fluid pressure in the recess 122 through the opening 125 in the plug 124. The upper portion 128 of the valve stem extends into the opening 125 and this portion, due to its shape, will permit fluid pressure to enter the recess 122 and will, due to its sliding engagement with the lug 124, guide the valve stem member so that there will be no binding action between this portion of the stem and the plug 124.

Assuming the car body to be in its righted and locked position as shown in full lines in Figs. 1 and 6 of the drawings and that it is to be tilted to the left hand side as shown in Figs. 2 and 7, the operation is as follows:—The operator connects one end of the supply pipe 76 on the right hand side of the car with a suitable fluid pressure supply source, such as an air reservoir of a locomotive, and then opens the valve 78 adjacent this end of the supply pipe, the valve 78 at the opposite end of the pipe being closed when a single car is to be operated. When a plurality of cars are to be tilted simultaneously this last referred to valve is opened as are all the valves on the right hand side of the cars with the exception of the one at the end of the last car, which valve is closed to prevent the escape of the fluid pressure. The operator, who may be at one side or the other of the car, moves the member 86 across the car a sufficient distance so that the ports 81 and 82 of the valve 80 will be open, thus permitting the fluid pressure to pass through the valve and pipe 79 into the lower ends of the cylinders 19 located on the right hand side of the car. The fluid pressure enters the cylinders beneath the pistons 39 and forces such pistons and piston rods 38 upwardly. As the piston rods are moved upwardly the parts 60 thereof will move the levers 71 upwardly causing the shaft 41 to rotate in the direction as indicated by the arrow in Fig. 9.

As the shaft 41 is moved in this direction the levers 57, at each end of the car body, are moved with it, which causes the locking member to move in the same direction at an increased speed, thus moving the leg 53 of each member out of its locking position with the adjacent locking bar 46. As these levers 57 are rotated with the shaft, the lugs 58 of such levers, which are in engagement with the link 42 within the notch 59, will cause the link 42 and locking bar 46 to move upwardly until the stop 48 on the locking bar is free of the stop 49 secured to the bolster as shown in Figs. 2, 4 and 5 of the drawings. At this time the bottoms of the slots 44 engage the shaft 41 and a further rotation of the shaft causes the link 42 to rotate in the same direction which causes the bar 46 to move in the direction as indicated by the arrow in Fig. 4, thus pulling the support 28 at each end of the left hand side of the car, inwardly out of engagement with the corresponding support 35 secured to the body.

As the supports 28 are moved out of supporting engagement with the members 35 on the left hand side of the car, the upper ends 37 of the piston rods on the right hand side of the car engage the members 36 within the notches 65 and as the pistons continue to move upwardly the car body will be tipped to the left hand side.

As the left hand side of the car body moves downwardly the lower end portions of the members 36 depending downwardly from this side of the body will engage the surfaces 67 of the portions 61 of the piston rods and will force the portions 61 in a direction toward the longitudinal center line of the car a sufficient distance to permit the members 36 to enter the cylinders 19. The portions 61 as they are moved in this direction force the lower portions of the levers 71 on the left hand side of the car out of engagement with the parts 60 so that when the car body is righted, as hereinafter described, the supports 28 on the right hand side of the car will not be moved from their supporting positions. It will here be noted that the members 36 are adapted to enter the cylinders 19 and due to this the cylinders can be spaced away from the longitudinal center line of the car a greater distance than has heretofore been possible with the result that the power from the cylinders is applied more advantageously to the car body, so that the car body is more easily tipped and righted. With this arrangement the cylinders can be placed nearer the bottom of the car body than has heretofore been possible; thus the cylinder can be made longer which will permit of a longer piston travel which is desirable in a car of this type.

In tipping the car the pistons move the right hand side of the car upwardly just enough to unbalance the body and when this has been done the body will, due to gravity, complete its tipping movement without the assistance of the pistons. It will, however, be noted that after the car body leaves the piston rods the fluid pressure continues to force the rods upwardly until such time as the groove 108 in the part 60 of one of the piston rods come in line with the cut off rod 106 at which time the fluid pressure in the chamber 95 will force the valve stem 97, valve stem extension 105 and cut off rod 106 longitudinally so that the outer end of the cut off rod will move into the groove 108 a sufficient distance so that the portion 101 of the valve stem will engage the valve seat 102 and will shut off the supply of fluid pressure to the cylinders before the pistons thereof have moved their maximum distance upwardly; thus any further upward movement of the pistons will be independent of the admission of fluid pressure thereto, and in this way the piston is prevented from striking the cylinder cover. The cutting off of the pressure before the piston has reached the cylinder head results in a great saving of fluid pressure.

The operator now moves the member 86 transversely of the car in the direction opposite to that indicated by the arrow in Fig. 13 until the lever 87 of the valve 80 is in the position as shown in dot and dash lines in Fig. 13, at which time the fluid pressure from the supply pipe will be cut off and the ports 82 and 83 be connected so that the fluid between the cylinders and the valve 80 may be exhausted to the atmosphere through the port 83. The pistons and piston rods now move downwardly by gravity and force the fluid back through valve 109 and pipe 79. As one of the pistons and piston rods moves downwardly and the end portion of the groove engages the end of the cut off rod, this rod together with the valve stem and valve stem extension are moved back by the part 60 a sufficient distance so that the portion 101 of the valve stem will be moved out of contact with the valve seat 102, thus permitting a portion of the exhaust fluid to pass through the valve 91 to the atmosphere. The valves 109 are for the purpose of assisting in exhausting the fluid from the cylinders and to thus facilitate the quick return of the pistons and piston rods to their normal positions of rest. When the valve 80 is in position to exhaust the fluid pressure and the pistons and piston rods move downwardly the exhaust pressure due to the weight of the pistons and piston rods will not all pass through the openings 122 in the portions 118 of the piston valve members 117 to the atmosphere through the port 83 of the valve 80 and the pressure which does not pass through these openings will raise the piston valves 117 from their seats, thus opening the port 114 to the atmosphere which permits the rapid discharge of the pressure from the cylinders through this port.

As the pistons and piston rods reach their normal positions of rest the ends of the levers 71 on the right hand side of the car will again seat on the upper portion of the part 60 of the piston rod. After the pistons and piston rods have moved to their normal positions of rest the operator, by the use of the member 86, moves the valve plug of the valve 80 to its shut off position.

To right the car body and to lock it in its righted position the operation is as follows:—The operator connects one end of the supply pipe 76 on the left hand side of the car with the fluid pressure supply source and then opens the valve 78 adjacent this end of the supply pipe, the valve at the opposite end of this pipe being closed when a single car is to be righted. The operator, who may be at one side of the car or the other, moves the member 85 a sufficient distance so that the ports 81 and 82 of the valve 80 at this side of the car will open, thus permitting the fluid pressure to pass through the valve and pipe 79 into the cylinders 19 on the left hand side of the car which causes the pistons, piston rods, and cut off valves to operate as hereinbefore described in connection with the tipping of the car with the exception that the upper portions 37 of the piston rods engage the members 36 within notches 130 adjacent the underside of the car floor and remain in such engagement until the car is righted.

As the car body is being righted the supports 28 will, due to the weighted portions 32, have a tendency to move outwardly by gravity to their normal supporting positions and as the body reaches its righted position these members will move under the members 35 and the stop 48 on the locking bar will move into locking engagement with the stop 49 secured to the bolster. As the locking bar is thus moved the shaft 41 will be rotated in the direction opposite to that indicated by the arrow in Fig. 9 so that the leg 53 will again be brought into locking position with the locking bar 46.

The operator now releases the fluid pressure from the cylinders on the left hand side of the car in the same manner as hereinbefore described permitting the pistons and piston rods to return to their normal positions of rest. As the pistons and piston rods return to their normal positions of rest the levers 71 on the left hand side of the car will again seat on the upper portions of the sleeves 60 of the piston rods.

Having thus described the invention what we claim as new and desire to secure by Letters Patent is:—

1. In a dump car, an underframe, a body mounted on said underframe and tiltable toward one side or the other thereof, pressure operated means on each side of the longitudinal center line of the car for operating said body, each of said means comprising a pressure cylinder, a member depending downwardly from each side of said body, one of said members being adapted to be engaged by one of said means for tilting said body toward one side, and the other of said members being adapted to enter the cylinder of the other of said means when the body is being tilted.

2. In a dump car, an underframe, a body mounted on said underframe and tiltable toward one side or the other, pressure operated means on each side of the longitudinal center line of the car for operating said body, each of said means comprising a cylinder, and a piston rod in said cylinder, a downwardly depending member on each side of said body, one of said members being adapted to be engaged by the piston rod in one of said cylinders to tilt said body to one side, and the other of said members being adapted to enter the other of said cylinders when the body is being tilted.

3. In a dump car, an underframe, a body tiltably mounted on said underframe, pressure means for righting said body after it has been tilted, said means comprising a pressure cylinder, and downwardly depending body members extending into said cylinder when said body is tilted.

4. In a dump car, a tilting body, a pressure cylinder and piston rod at each side of the longitudinal center line of said body, for tilting and righting said body, and a downwardly depending member on ecah side of said body, one of said members being adapted to be engaged by the piston rod at one side of said body to tilt the body, and the other of said members being adapted to extend into the cylinder at the opposite side of said body when said body is tilted.

5. In a dump car, the combination with a tilting body, of a pressure cylinder and piston means for tilting said body in one direction, said cylinder being adapted to receive a portion of said body when said body is tilted in the opposite direction.

6. In a dump car, the combination with a tilting body having a downwardly depending portion, of a pressure cylinder beneath said body, and a piston rod operatively mounted in said cylinder and adapted to engage said depending portion to tilt said body in one direction, said cylinder being adapted to receive said depending portion when said body is tilted in the opposite direction.

7. In a dump car, a tilting body having a downwardly depending member, pivoted pressure actuated piston rods adapted to engage said depending member to tilt said body in one direction, and means attached to said piston rods and to the underframe of the car for holding one of said piston rods, when the other of said piston rods is in its extreme dumping position, in the path of travel of said member when said body is being righted.

8. In a dump car, an underframe, a body tiltably mounted on said underframe, a member pivotally mounted on said underframe for supporting said body in its righted position, a locking bar pivotally connected with said member adapted to engage said underframe to lock said member in its supporting position, a rotatable shaft, means between said shaft and bar for moving said bar to unlock said member and move it out of supporting position and means on said shaft for preventing movement of said bar when said member is in its supporting position.

9. In a dump car, an underframe, a body tiltably mounted on said underframe, a member movably mounted on said underframe for supporting said body in its righted position, a locking bar connected with said member adapted to engage said underframe to lock said member in its supporting position, means for moving said bar out of locking engagement with said underframe and for also moving said member out of supporting position with said body, and independent means adapted to prevent accidental unlocking movement of said locking bar.

10. In a dump car, an underframe, a body tiltably mounted on said underframe, a member movably mounted on said underframe for supporting said body in its righted position, a locking bar connected with said member adapted to engage said underframe, to lock said member in its supporting position and for moving said member out of its supporting position, an operating shaft, an operating member connected with said locking bar and loosely mounted on said shaft, means movable with said shaft for engaging and moving the last mentioned member to operate said bar, and a lock member mounted on said shaft adapted to lock said bar in its locking position, said lock member being mounted on said shaft and movable by said operating member.

11. In a dump car, a tilting body, a member for supporting said body in its righted position, and means for moving said member out of its supporting position, said means comprising an operating shaft, a locking bar connected with said member, a link loosely mounted on said shaft and connected with said bar, and means on said shaft for operating said link.

12. In a dump car, a tilting body, a member for supporting said body in its righted position, an operating shaft, a locking bar connected with said member, a link loosely mounted on said shaft and connected with said locking bar, a lever on said shaft and movable therewith adapted to engage and operate said link, and a locking member loosely mounted on said shaft adapted to lock said bar in its locking position, said locking member being loosely mounted on said shaft and being movable to its unlocking position by said link.

13. In a dump car, a tilting body, an underframe, a member supporting said body in its righted position, and means for locking said member in its supporting position, said means comprising a locking bar connected with said member and adapted to be moved into and out of locking engagement with said underframe and a lock member adapted to cooperate with said bar to maintain said bar in its locked position.

14. In a dump car, an underframe, a body tiltably mounted on said underframe, a member movably mounted on said underframe for supporting said body in its righted position, a bar connected with said member adapted to engage said underframe to lock said member in its supporting position, and a member for maintaining said bar in its locked position.

15. In a dump car, an underframe, a body tiltably mounted on said underframe, a member mounted on said underframe for supporting said body in its righted position and movable out of supporting position to permit said body to tilt to one side, a bar connected with said member adapted to engage said underframe to lock said member in its supporting position, said bar being movable out of engagement with said underframe to unlock said member, means for moving said bar out of its locking engagement and for moving said member out of its supporting position, and means for maintaining said bar in its locking engagement when said member is in its supporting position.

16. In a dump car, an underframe, a body tiltably mounted on said underframe, a member movably mounted on said underframe for supporting said body in its righted position, a locking bar connected with said member adapted to engage said underframe to lock said member in its supporting position, means for moving said bar out of engagement with said underframe and for moving said member out of its supporting position, said means comprising an operating shaft, an operating member connected with said bar and loosely mounted on said shaft, and means on said shaft for moving said operating member whereby said locking bar is moved out of engagement with said underframe and moved in the direction of its length to move said member out of its supporting position.

17. In a dump car, an underframe, a body tiltably mounted on said underframe, a member for supporting said body in its righted position, a shaft, an operating member loosely mounted on said shaft, a locking bar connecting said member and said operating member and adapted to engage said underframe to lock said member in its supporting position, a connection between said shaft and said operating member for transmitting movement from said shaft to said operating member, and means for maintaining said locking bar in its locking position, said means being movable by said operating member to a position whereby said bar may be moved out of its locking engagement with said underframe.

18. In a dump car, an underframe, a body tiltably mounted on said underframe, fluid pressure means for operating said body, a member pivotally mounted on said underframe for supporting said body in its righted position, a locking bar pivotally connected with said member adapted to engage said underframe to lock said member in its supporting position, a shaft operable by said fluid pressure means for directly operating said bar, and means on said shaft for maintaining said bar in its locked position.

19. In a dump car, a tilting body, a fluid pressure cylinder, a piston and piston rod in said cylinder movable by fluid pressure to tilt said body, a valve operated by said piston rod for shutting off the fluid pressure to said cylinder when said rod has been moved a predetermined distance when the body is being tilted, a release valve between the first mentioned valve and said cylinder adapted to release the fluid pressure from said cylinder to permit said piston to return to its normal position of rest after said body has been tilted, said piston, as it returns, being adapted to move the first mentioned valve to an open position.

20. In a dump car, a tilting body, fluid pressure operated means for tilting said body, a fluid pressure valve operated by said means for shutting off the pressure from said means when the body is tilted, and a valve for automatically releasing the fluid pressure from said means when the fluid pressure is shut off by said fluid pressure valve.

21. In a dump car, a tiltable body, fluid pressure operated means for operating said body, a fluid pressure cut off valve operated by said means, and a pressure release valve controlled by said cut off valve.

22. In a dump car, a tiltable body, fluid pressure operated means for operating said body, a valve operated by said means for controlling the fluid pressure and a valve connected with the first mentioned valve and controlled thereby.

In testimony whereof, we affix our signatures.

WILLIAM L. BURNER.
OSCAR E. KANTENWEIN.